(12) United States Patent
Fitzgerald

(10) Patent No.: US 11,919,344 B2
(45) Date of Patent: Mar. 5, 2024

(54) ICE ANCHORING SYSTEM AND METHOD

(71) Applicant: James Fitzgerald, Pelican Rapids, MN (US)

(72) Inventor: James Fitzgerald, Pelican Rapids, MN (US)

( * ) Notice: Subject to any disclaimer, the term of this patent is extended or adjusted under 35 U.S.C. 154(b) by 680 days.

(21) Appl. No.: 17/142,403

(22) Filed: Jan. 6, 2021

(65) Prior Publication Data

US 2021/0237525 A1 Aug. 5, 2021

Related U.S. Application Data

(60) Provisional application No. 62/958,214, filed on Jan. 7, 2020.

(51) Int. Cl.
*B60D 1/58* (2006.01)
*B60D 1/18* (2006.01)

(52) U.S. Cl.
CPC .............. *B60D 1/58* (2013.01); *B60D 1/187* (2013.01)

(58) Field of Classification Search
CPC .................................. B60D 1/58; B60D 1/187
See application file for complete search history.

(56) References Cited

U.S. PATENT DOCUMENTS

| | | | | |
|---|---|---|---|---|
| 2,973,065 | A * | 2/1961 | Cordes | E02D 5/803 52/166 |
| 3,833,241 | A * | 9/1974 | Acosta | B60P 7/0807 410/12 |
| 4,363,198 | A | 12/1982 | Meyer | |
| 5,461,833 | A | 10/1995 | Murray | |
| 5,887,840 | A * | 3/1999 | Hoffman | B60P 7/0807 248/502 |
| 7,334,764 | B2 * | 2/2008 | Robert | F16G 11/02 114/230.29 |
| 2007/0170295 | A1 * | 7/2007 | Breeden | B60D 1/18 242/388.1 |
| 2012/0017959 | A1 | 1/2012 | Simonson | |
| 2013/0146112 | A1 | 6/2013 | Abraham | |
| 2014/0166798 | A1 | 6/2014 | Davison | |
| 2016/0083926 | A1 * | 3/2016 | Rosier | E02D 5/803 52/741.1 |
| 2016/0297265 | A1 | 10/2016 | Sparkes | |

* cited by examiner

*Primary Examiner* — Bryan A Evans

(57) ABSTRACT

An ice anchoring system includes a tether that is elongated and has a first end and a second end. An anchor is attached to the second end of the tether. The anchor has length dimension extending from a first lateral edge to a second lateral edge and a width dimension extending from a front side to a rear side. The length dimension is elongated with respect to the width dimension. The tether is secured to the anchor such that a longitudinal axis of the anchor extending through the first and second lateral edges forms an angle with a horizontal plane between 0° and 45° when the anchor is hung freely from the tether.

16 Claims, 7 Drawing Sheets

ICE ANCHORING SYSTEM AND METHOD

CROSS-REFERENCE TO RELATED APPLICATIONS

I hereby claim the benefit under 35 U.S.C. Section 119(e) of U.S. Provisional application 62/958,214 filed Jan. 7, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to ice anchor device and more particularly pertains to a new ice anchor device for creating an anchored support on the ice layer of water to allow a stuck vehicle utilize the anchored support to dislodge itself from being stuck on the ice layer of the body of water.

(2) Description of Related Art Including Information Disclosed Under 37 CFR 1.97 and 1.98

The prior art relates to ice anchor devices and other anchoring devices which are non-fixed and easily removable from their anchored positioned when not in use.

BRIEF SUMMARY OF THE INVENTION

An embodiment of the disclosure meets the needs presented above by generally comprising a tether that is elongated and has a first end and a second end. An anchor is attached to the second end of the tether. The anchor has length dimension extending from a first lateral edge to a second lateral edge and a width dimension extending from a front side to a rear side. The length dimension is elongated with respect to the width dimension. The tether is secured to the anchor such that a longitudinal axis of the anchor extending through the first and second lateral edges forms an angle with a horizontal plane between 0° and 45° when the anchor is hung freely from the tether.

In another embodiment, a method provided for dislodging a vehicle positioned on an ice layer atop a body of water. The method includes extending an anchor attached to a tether through a hole in the ice layer. The tether is elongated and has a first end and a second end. The anchor is attached to the second end of the tether. The anchor has length dimension extending from a first lateral edge to a second lateral edge and a width dimension extending from a front side to a rear side. The length dimension is elongated with respect to the width dimension and the length dimension is greater than a diameter of the hole in the ice layer. The width dimension is smaller than the diameter of the hole. The anchor is allowed to completely sink below a bottom surface of the ice layer such that a longitudinal axis of the anchor extends through the first and second lateral edges moves toward a horizontal orientation. The anchor is then lifted such that a top side of the anchor adjacent to each of the first and second lateral edges abuts the bottom surface and the anchor completely traverses a bottom entrance of the hole. The first end of the tether is secured to a vehicle and the slack removed in the tether between the vehicle and the anchor. A length of the tether is shortened such that the anchor provides a stop relative to the vehicle and the vehicle is pulled toward the hole to dislodge the vehicle from a stuck position relative to the ice layer. The anchor is lowered away from the ice layer to facilitate free movement of the anchor relative to the ice the layer. A biasing member attached to the anchor is actuated to urge the longitudinal axis toward a vertical orientation so that the anchor can be pulled upwardly through the hole with tether.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 3:
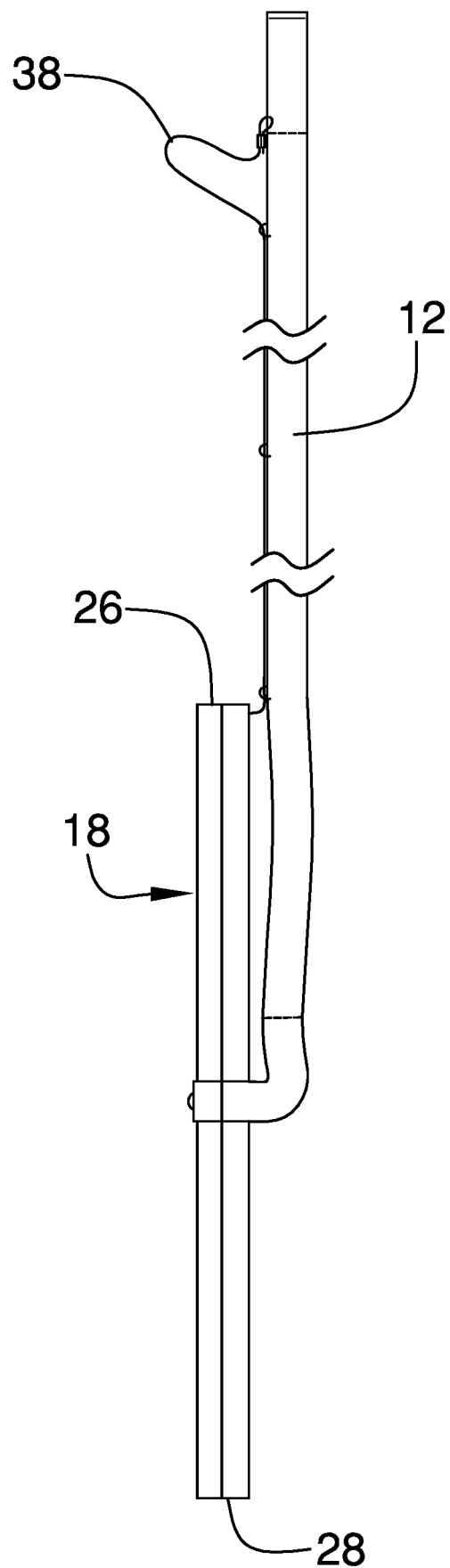
Figure 4:
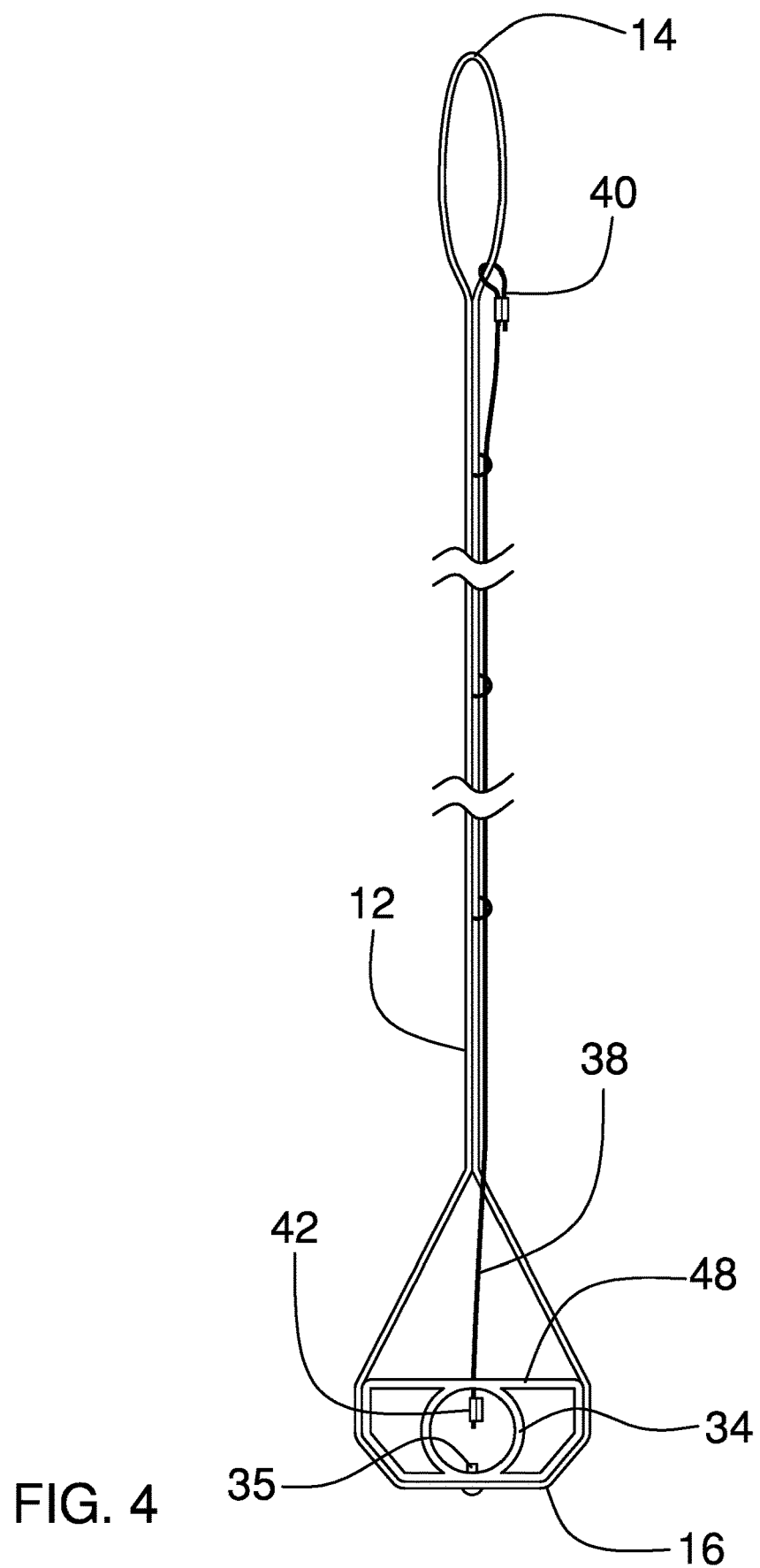
Figure 5:
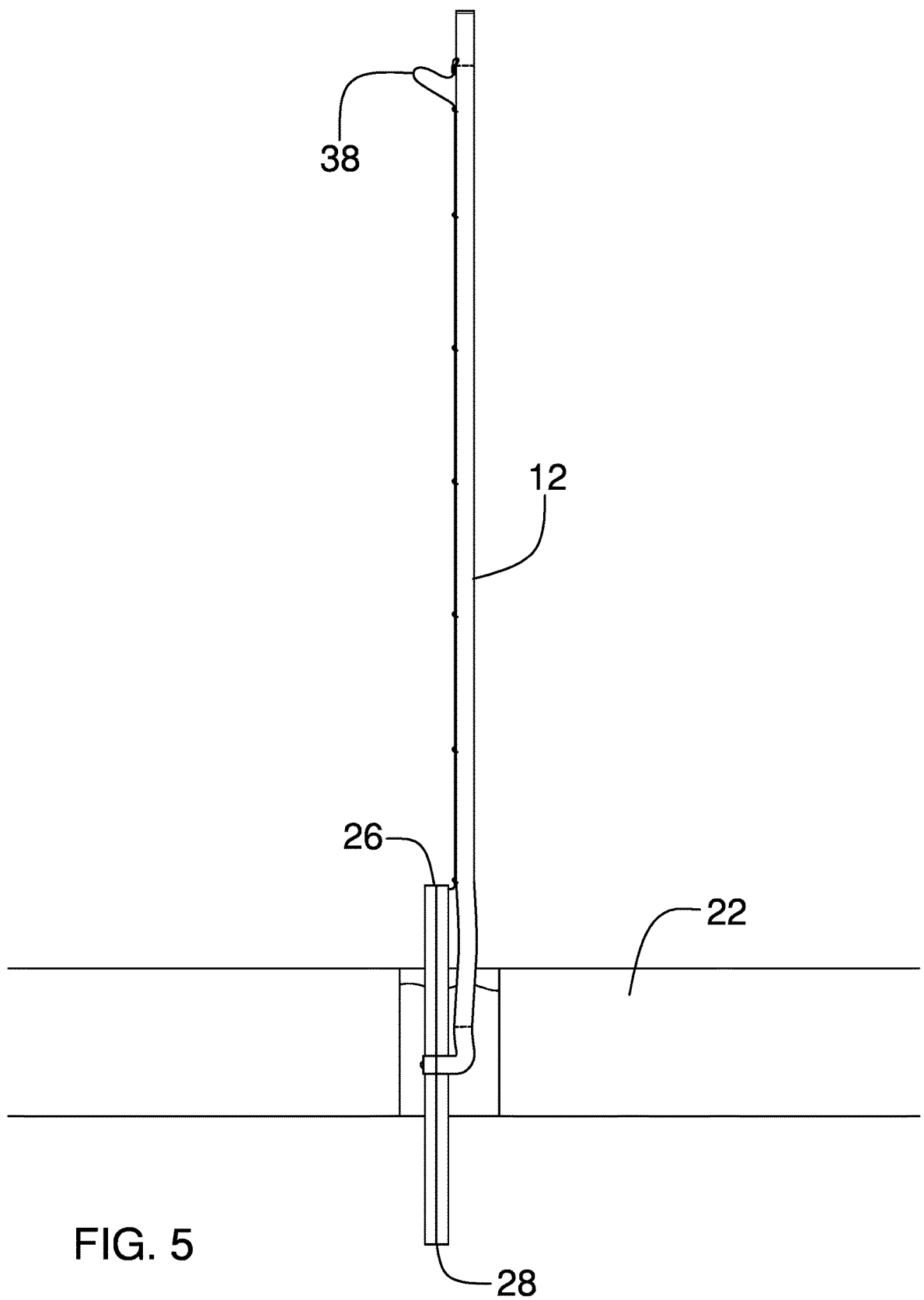
Figure 6:
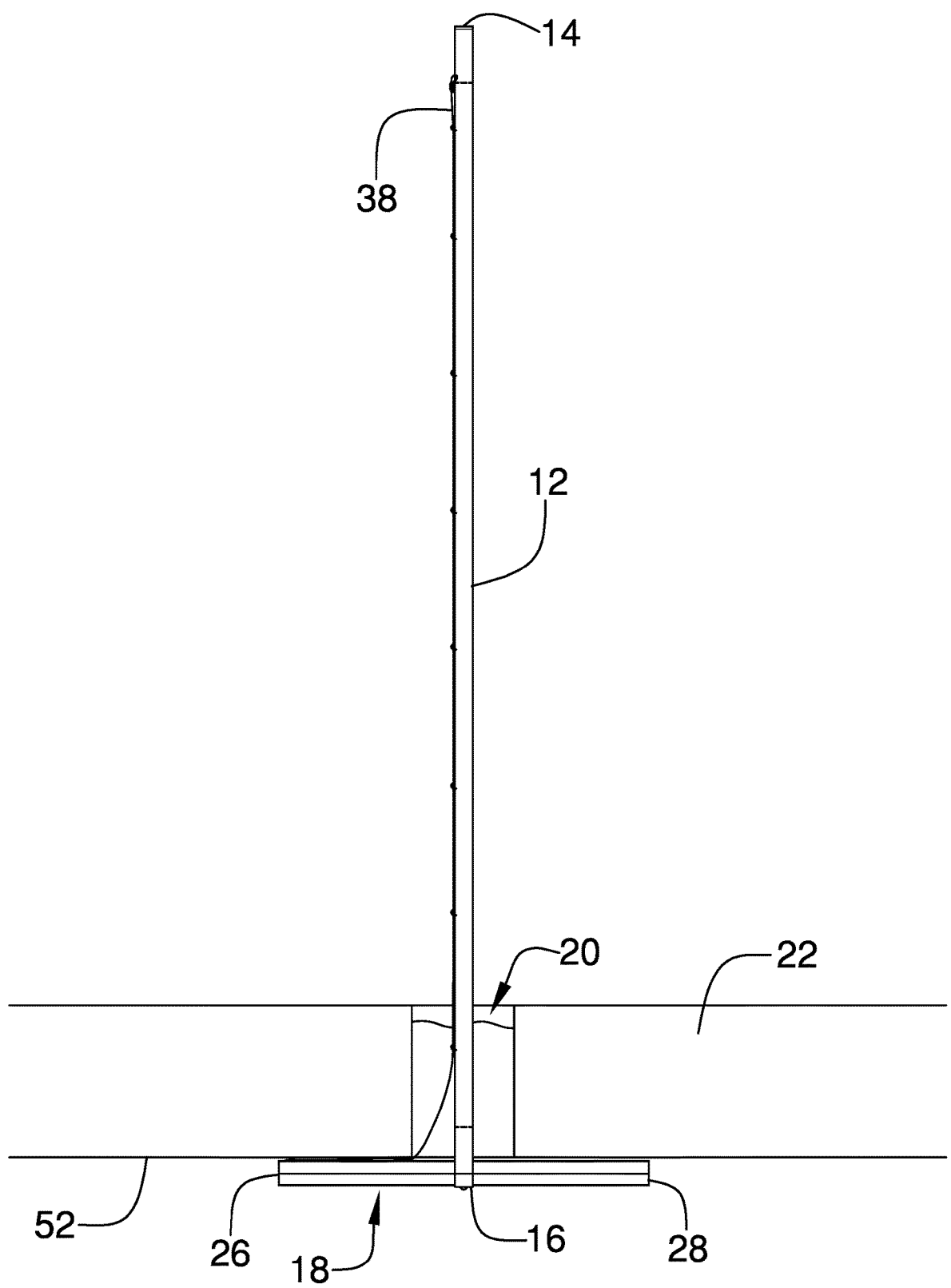
Figure 7:
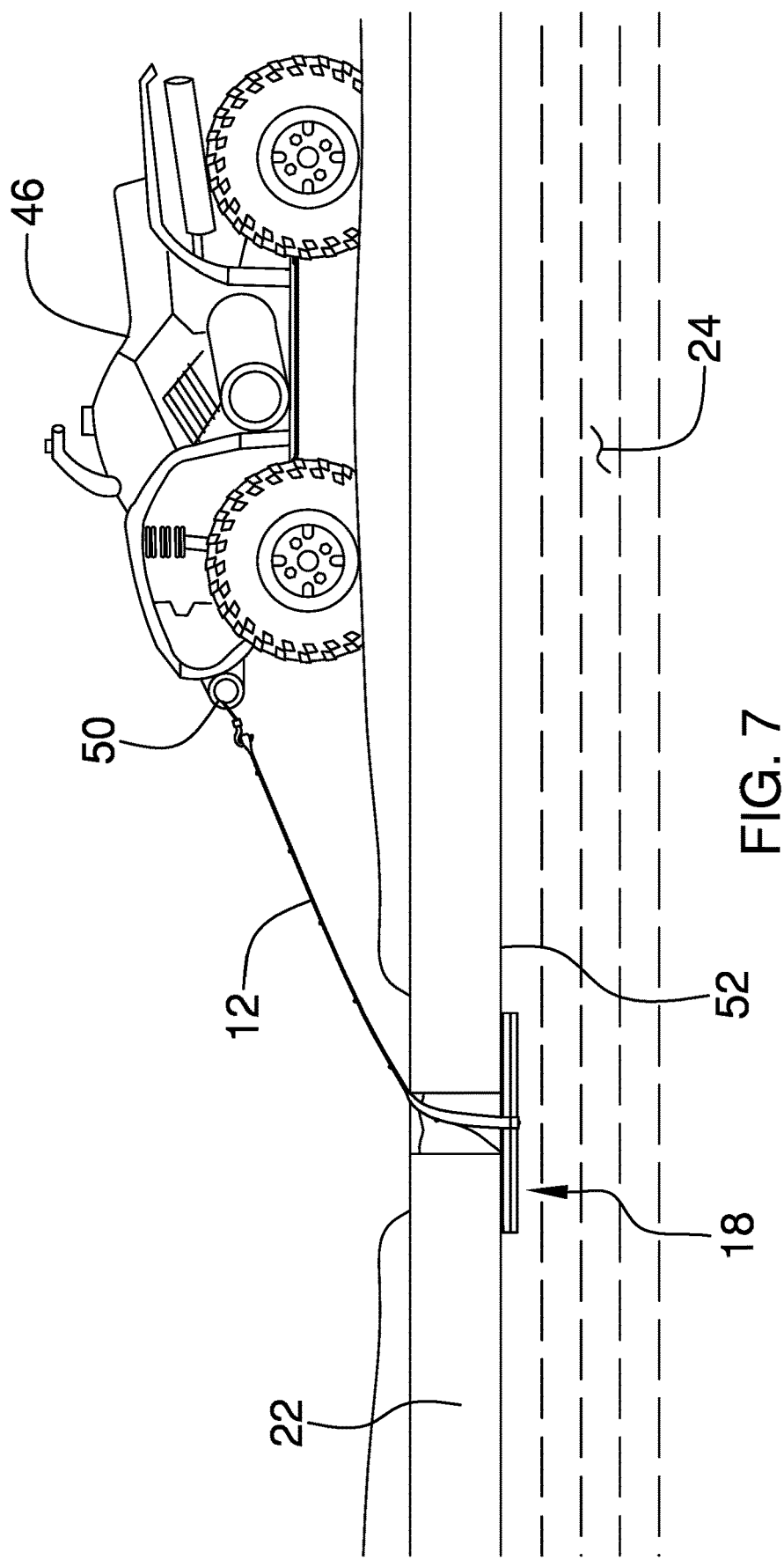

FIG. 3 is a front view of an embodiment of the disclosure.
FIG. 4 is a side view of an embodiment of the disclosure.
FIG. 5 is a side view of an embodiment of the disclosure.
FIG. 6 is a side view of an embodiment of the disclosure.
FIG. 7 is a side view of an embodiment of the disclosure.

DETAILED DESCRIPTION OF THE INVENTION

With reference now to the drawings, and in particular to FIGS. 1 through 7 thereof, a new ice anchor device embodying the principles and concepts of an embodiment of the disclosure and generally designated by the reference numeral 10 will be described.

As best illustrated in FIGS. 1 through 7, the ice anchoring system 10 and method generally comprises a tether 12 that is elongated and has a first end 14 and a second end 16. The tether 12 has a length from the first end 14 to the second end 16 that is greater than 3.0 feet and will typically have a length no greater than 100 feet, though any suitable length may be chosen for the required task. The tether 12 comprises conventional materials used for towing or securing relatively heavy articles. Thus, a nylon webbing material may be preferred as such straps have a high strength to weight ratio and can be easily stored by rolling the straps up when not in use. Other materials may include conventional ropes, chains and the like. The first end 14 may comprise a closed loop that is fixed as a closed loop to facilitate attachment of the first end 14 to articles requiring such according to the disclosure herein.

An anchor 18 is attached to the second end 16 of the tether 12. The anchor 18 will typically be less buoyant than water such that the anchor 18 sinks when positioned in a body of water, and more specifically through a hole 20 in an ice layer 22 atop the body of water 24. The anchor 18 has length dimension extending from a first lateral edge 26 to a second lateral edge 28 and a width dimension extending from a front side 30 to a rear side 32. The length dimension is elongated with respect to the width dimension. The length dimension may be equal to at least 9.0 inches, and the width dimension may be equal to no more than 6.0 inches. More particularly, the anchor will have a length greater than about 15.0 inches. The shape of the anchor 18 is not critical to the system 10 though the anchor 18 may have a generally symmetrical shape when comparing lateral halves thereof to each other. As can be seen in the Figures, the anchor 18 may comprise a tubular member with open ends and a buttressing 34 within the tubular member to increase its strength. In the figures the buttressing 34 shows a cylinder though a triangular tube, braces, or other structures will suffice. Alternatively, the anchor 18 may comprise a single, unitary piece of material with or without openings or cavities. Essential to the system 10 and method is that the anchor 18 resists bending when used according to the method herein and therefor may be constructed utilizing methods known within the art. The anchor 18 will most typically be comprised of a rigid material which be metallic in nature and include various metals and their alloys. Aluminum, steel and like materials will often be utilized for their strength and ease of manufacture.

Figure 1:
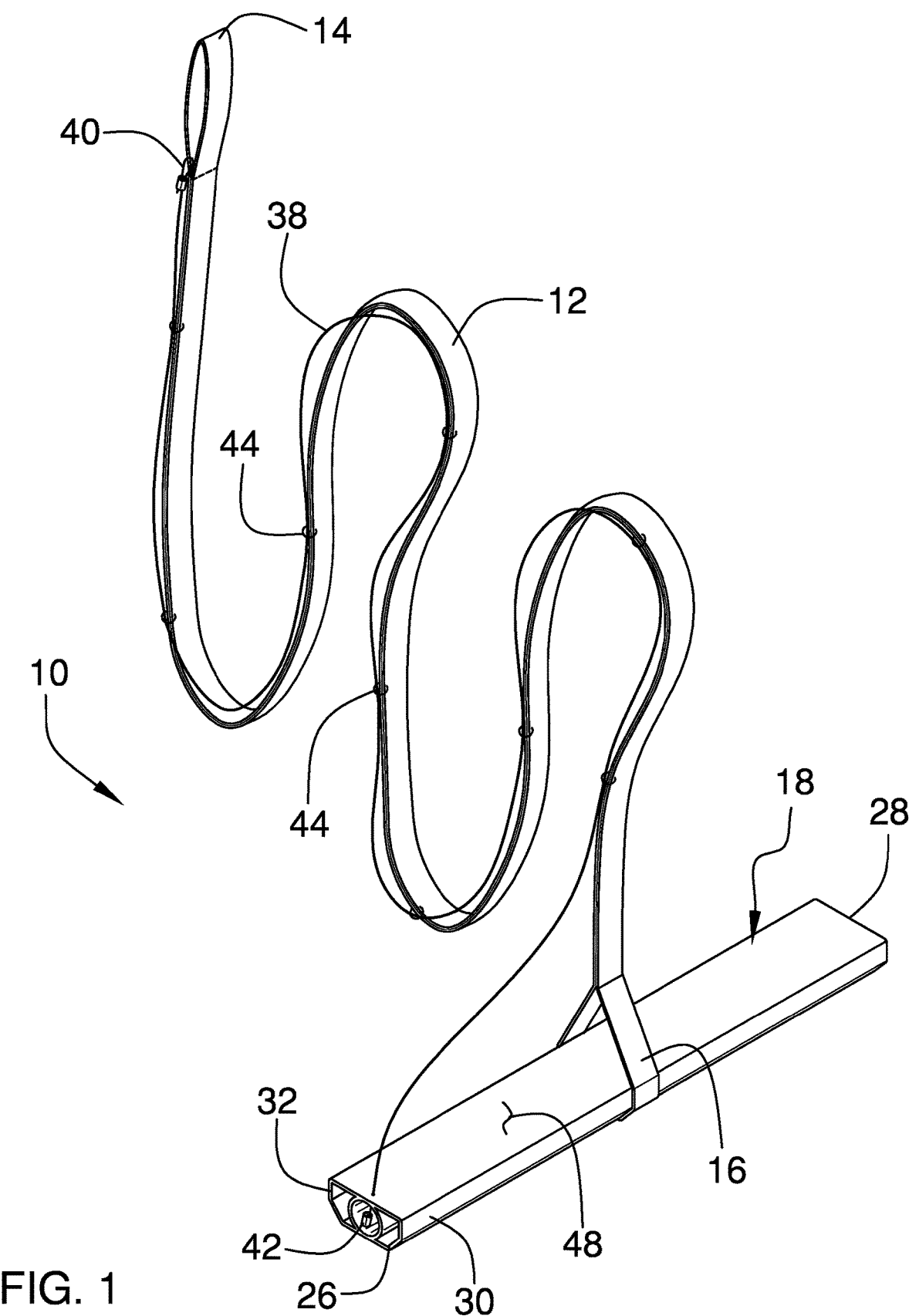
FIG. 1 is a front isometric view of an ice anchoring system and method according to an embodiment of the disclosure.
Figure 2:
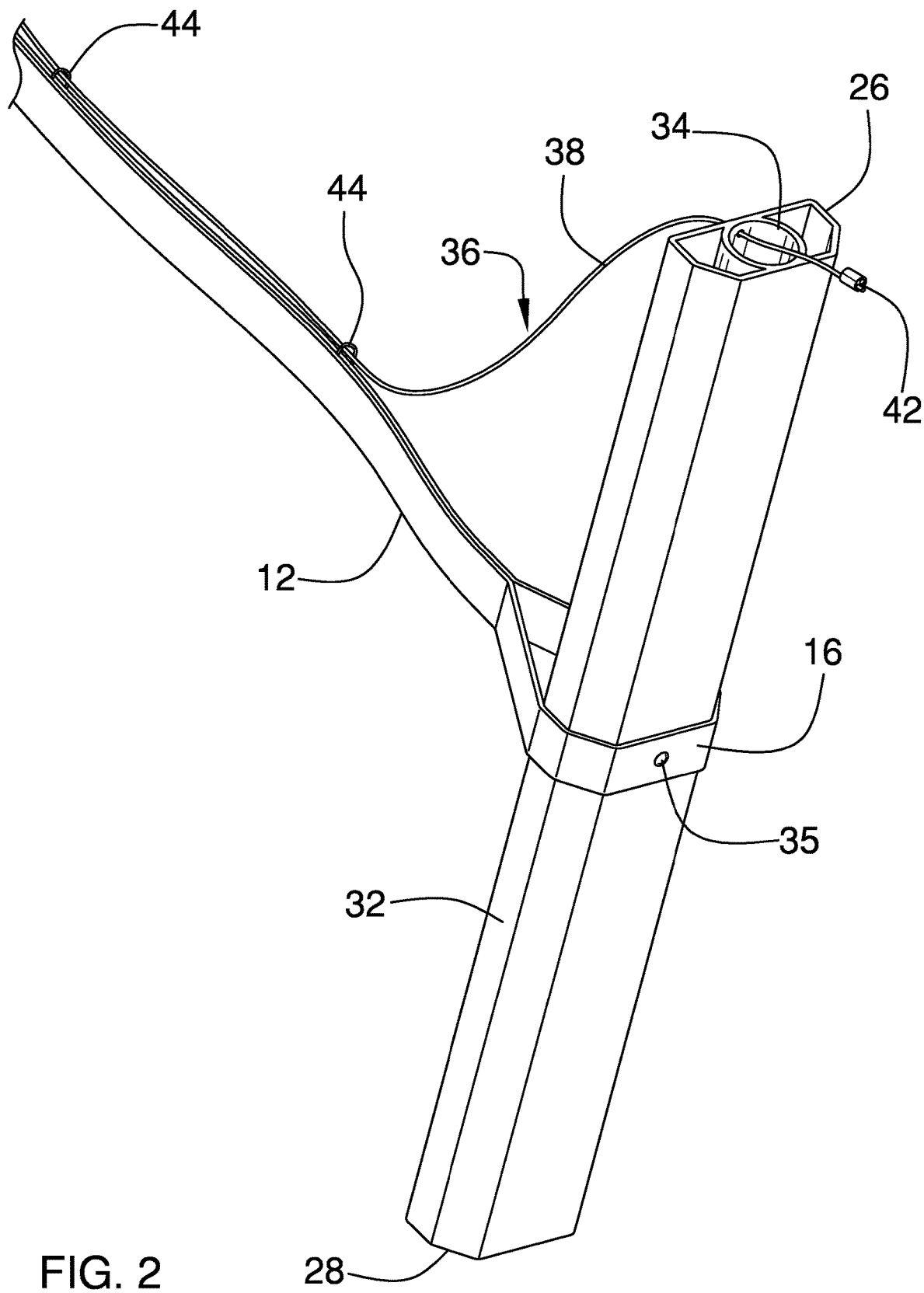
FIG. 2 is a rear bottom isometric view of an embodiment of the disclosure.

The tether 12 is secured to the anchor 18 such that a longitudinal axis of the anchor 18 extending through the first 26 and second 28 lateral edges forms an angle with a horizontal plane between 0° and 45° when the anchor 18 is hung freely from the tether. That is, the anchor 18 is generally self-balancing toward a horizontal orientation as shown in FIG. 4 when hung from the tether 12. As can seen in the figures, the tether 12 may extend around the anchor 18 at its center of gravity and secured in place with a fastener 35. The loop extending around the anchor 18 as shown in FIG. 2 may instead be extended through the anchor 18 either through its front side 30 and back side 32, or through its first 26 and second 28 lateral edges.

A biasing member 36 is attached to the anchor 18 and is actuated to urge the longitudinal axis toward a vertical orientation as shown in FIG. 3. The biasing member 36 may include a cable 38 that has an upper end 40 and lower end 42. The lower end 42 is attached to the anchor 18 nearer to the first lateral edge 26 than the second lateral edge 28. When the upper end 40 of the cable 38, or any portion of the cable 38 between the upper end 40 and the lower end 42, is pulled upwardly, the first lateral edge 26 is biased upwardly to form the angle with the horizontal plane is greater than 75°. The cable 38 may be comprised of any conventional material including natural and synthetic rope, metal cabling, plastic lines/string, and the like. Since the biasing of the anchor 18 into the vertical orientation will require the movement of a very small amount of mass, the material of the cable 38 is not particularly relevant to the system 10, though the cable 38 should be flexible to easily conform to the shape of the tether 12 as needed. A plurality of eyelets 44 is attached to the tether 12 and the eyelets 44 are spaced from each other along a line extending from the first end 14 to the second end 16. If a strap is used, the eyelets 44 may be positioned along one of the edges of the strap as shown in the Figures. The cable 38 extends through the eyelets 44 and the upper end 40, may be bulbous such that it cannot be easily pulled through eyelets 44. While one of the eyelets 44 is positioned adjacent to the first end 14, the eyelets may only be positioned adjacent to the anchor 18, and only from about between 1.0 and 7.0 feet from the anchor 18, and therefore not needed adjacent to adjacent to the first end 14.

Though not shown, water buoyant floats may be attached to the tether to prevent the tether from sinking into the body of water 24 should the tether and anchor accidentally be completely dropped through the hole 20. The floats may be attached to the tether at any workable location along its length and may comprise conventional plastic foam materials, for example, having enough buoyancy to prevent the anchor from pulling the floats under water.

In use, the system 10 allows a person to create a stable, support anchor in an ice layer 22. The ice layer 22 may most typically be the top ice coat of a lake which is also often covered with snow. Vehicles 46, include cars, trucks, ATVs and the like can become either stuck in the snow or bound to the ice and snow during melt/freeze cycles. When this happens, the system 10 may be utilized to assist in dislodging the vehicle 46 from its stuck position. To use the system 10, the user first utilizes a hole 20, or drills a hole 20, in the ice layer 22 with an ice auger or other hole cutting device. The anchor 18 is then dropped into the hole 20 and allowed to sink below the ice layer 22 so that the anchor 18 levels into a horizontal orientation. The anchor 18 is then pulled upwardly with the tether 12 so that a top side 48 of the anchor 18, adjacent to both of the first 26 and second 28 lateral edges, abuts the bottom surface 52 of the ice layer 22 and the anchor 18 spans the entrance of the hole 20 as shown in FIG. 6. The first end 14 of the tether 12 is then secured to the vehicle 46 and the slack in the tether 12 between the vehicle 46 and anchor 18 is removed to create tension in the tether 12. The tether 12 will often be attached to a winch 50 on the vehicle. The length of the tether 12, between the vehicle 46 and the anchor 18, is then shortened, most often by winding the tether with a winch on the vehicle 46, such that the vehicle 46 is pulled toward the anchor 18. This will dislodge the vehicle 46 from its stuck position. The tether 12 is then removed from the vehicle 46 and the biasing member 36 used to pull the first lateral edge 26 upwardly to a position shown in FIG. 5 to allow the anchor 18 to be pulled upwardly through the hole 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ice anchoring assembly for providing a point of stability on an ice layer atop a body of water, the assembly comprising:
   a tether that is elongated and has a first end and a second end;
   an anchor being attached to the second end of the tether, the anchor having length dimension extending from a first lateral edge to a second lateral edge and a width dimension extending from a front side to a rear side, the length dimension being elongated with respect to the width dimension;
   the tether being secured to the anchor such that a longitudinal axis of the anchor extending through the first and second lateral edges forms an angle with a horizontal plane between 0° and 45° when the anchor is hung freely from the tether
   a biasing member being attached to the anchor, the biasing member being actuated to urge the longitudinal axis toward a vertical orientation; and
   a plurality of eyelets being attached to the tether and being spaced from each other along a line extending from the first end to the second end, the biasing member extending through the eyelets.

2. The ice anchoring assembly according to claim 1, wherein the tether has length from the first end to the second end being greater than 3.0 feet.

3. The ice anchoring assembly according to claim 1, wherein the tether comprises a nylon webbing material.

4. The ice anchoring assembly according to claim 1, wherein the first end comprises a closed loop.

5. The ice anchoring assembly according to claim 1, wherein the anchor is less buoyant than water such that the anchor sinks when positioned in the body of water.

6. The ice anchoring assembly according to claim 1, wherein the length dimension is equal to at least 9.0 inches, the width dimension being equal to no more than 6.0 inches.

7. The ice anchoring assembly according to claim 1, wherein the anchor is comprised of a rigid material.

8. The ice anchoring assembly according to claim 7, wherein the rigid material is a metallic material.

9. The ice anchoring assembly according to claim 1, wherein the biasing member includes a cable having an upper end and lower end, the lower end being attached to the anchor nearer to the first lateral edge than the second lateral edge, the upper end of the cable being pulled upwardly to bias the first lateral edge upwardly to form the angle with the horizontal plane being greater than 75°.

10. An ice anchoring assembly for providing a point of stability on an ice layer atop a body of water, the assembly comprising:
    a tether that is elongated and has a first end and a second end, the tether having a length from the first end to the second end being greater than 3.0 feet, the tether comprising a nylon webbing material, the first end comprising a closed loop;
    an anchor being attached to the second end of the tether, the anchor being less buoyant than water such that the anchor sinks when positioned in the body of water, the anchor having length dimension extending from a first lateral edge to a second lateral edge and a width dimension extending from a front side to a rear side, the length dimension being elongated with respect to the width dimension, the length dimension being equal to at least 9.0 inches, the width dimension being equal to no more than 6.0 inches, the anchor being comprised of a rigid material, the rigid material being a metallic material;
    the tether being secured to the anchor such that a longitudinal axis of the anchor extending through the first and second lateral edges forms an angle with a horizontal plane between 0° and 45° when the anchor is hung freely from the tether;
    a biasing member being attached to the anchor, the biasing member being actuated to urge the longitudinal axis toward a vertical orientation, the biasing member including a cable having an upper end and lower end, the lower end being attached to the anchor nearer to the first lateral edge than the second lateral edge, the upper end of the cable being pulled upwardly to bias the first lateral edge upwardly to form the angle with the horizontal plane being greater than 75°; and
    a plurality of eyelets being attached to the tether and being spaced from each other along a line extending from the first end to the second end, the cable extending through the eyelets.

11. A method of dislodging a vehicle positioned on an ice layer atop a body of water, the method including the steps of:
    extending an anchor attached to a tether through a hole in the ice layer, the tether is elongated and has a first end and a second end, the anchor being attached to the second end of the tether, the anchor having length dimension extending from a first lateral edge to a second lateral edge and a width dimension extending from a front side to a rear side, the length dimension being elongated with respect to the width dimension, the length dimension being greater than a diameter of the hole in the ice layer, the width dimension being smaller than the diameter of the hole;
    letting the anchor completely sink below a bottom surface of the ice layer such that a longitudinal axis of the anchor extending through the first and second lateral edges moves toward a horizontal orientation;
    lifting the anchor with the tether such that a top side of the anchor adjacent to each of the first and second lateral edges abuts the bottom surface and the anchor completely traverses a bottom entrance of the hole;
    securing the first end of the tether to a vehicle and removing slack in the tether between the vehicle and the anchor;
    shortening a length of the tether such that the anchor provides a stop relative to the vehicle and the vehicle is pulled toward the hole and dislodged from a stuck position relative to the ice layer;
    lowering the anchor away from the ice layer to facilitate free movement of the anchor relative to the ice the layer;
    actuating a biasing member attached to the anchor to urge the longitudinal axis toward a vertical orientation; and
    pulling the anchor upwardly through the hole with tether.

12. The method according to claim 11, wherein in the step of extending the anchor attached to the tether through a hole further includes the step of the tether comprising a nylon webbing material.

13. The method according to claim 11, wherein in the step of extending the anchor attached to the tether through a hole further includes the first end comprising a closed loop.

14. The method according to claim 11, wherein in the step of extending the anchor attached to the tether through a hole further includes anchor being comprised of a metallic material.

15. The method according to claim 11, wherein in the step of actuating the biasing member further includes the step of the biasing member including a cable having an upper end and lower end, the lower end being attached to the anchor nearer to the first lateral edge than the second lateral edge.

16. The method according to claim 11, wherein in the step of actuating the biasing member further includes the step of the biasing member including a plurality of eyelets being attached to the tether and being spaced from each other along a line extending from the first end to the second end, the cable extending through the eyelets.

\* \* \* \* \*